United States Patent [19]
Yamakawa et al.

[11] Patent Number: 5,259,050
[45] Date of Patent: Nov. 2, 1993

[54] MULTICORE OPTICAL CONNECTOR WITH PARTITIONS TO SEPARATE THE OPTICAL FIBERS INTO GROUPS

[75] Inventors: Jun Yamakawa; Toshihiko Oota; Masami Saito; Hiroyuki Yamada, all of Tokyo; Michito Matsumoto; Tadashi Haibara, both of Mito, all of Japan

[73] Assignees: The Furukawa Electric Co., Ltd.; Nippon Telegraph and Telephone Corporation, both of Tokyo, Japan

[21] Appl. No.: 938,766

[22] Filed: Sep. 1, 1992

[30] Foreign Application Priority Data

Sep. 4, 1991 [JP] Japan .................. 3-78735[U]

[51] Int. Cl.⁵ .............................. G02B 6/38
[52] U.S. Cl. .................. 385/59; 385/71; 385/89; 385/114
[58] Field of Search .......... 385/77, 76, 54, 55, 385/58, 59, 70, 71, 89, 114

[56] References Cited

U.S. PATENT DOCUMENTS

| | | | |
|---|---|---|---|
| 3,871,935 | 3/1975 | Gloge et al. | 156/158 |
| 4,341,439 | 7/1982 | Hodge | 385/59 |
| 4,385,801 | 5/1983 | Bubanko | 385/59 |
| 4,801,191 | 1/1989 | Nakai et al. | 385/59 |
| 4,944,568 | 7/1999 | Danbach et al. | 350/96.20 |

FOREIGN PATENT DOCUMENTS

| | | | |
|---|---|---|---|
| 0064096 | 11/1982 | European Pat. Off. | 358/59 |
| 0030112 | 3/1981 | Japan | 385/59 |
| 0080012 | 7/1981 | Japan | 385/59 |
| 59-049510 | 3/1984 | Japan | |
| 60-135911 | 7/1985 | Japan | |
| 60-135912 | 7/1985 | Japan | |
| 2191640 | 12/1987 | United Kingdom | 385/59 |

Primary Examiner—John D. Lee
Assistant Examiner—Phan T. Heartney
Attorney, Agent, or Firm—Frishauf, Holtz, Goodman & Woodward

[57] ABSTRACT

A multicore optical connector includes a connector body having a pair of alignment pin holes and a plurality of optical fiber holes formed therebetween and optical fibers inserted in the optical fiber holes such that the end faces of the optical fibers are exposed through the optical fiber holes. In the multicore optical connector, the optical fiber holes are divided into optical fiber hole groups of a number which coincides with the number of the groups of the optical fibers, and the optical fiber hole groups are separated from one another.

6 Claims, 2 Drawing Sheets

MULTICORE OPTICAL CONNECTOR WITH PARTITIONS TO SEPARATE THE OPTICAL FIBERS INTO GROUPS

BACKGROUND OF THE INVENTION

1. Field of the Invention

The present invention relates to a multicore optical connector for use in connecting multicore optical fiber.

2. Description of the Related Art

A conventional multicore optical connector has a structure such as is shown in FIG. 1. Referring to FIG. 1, numerals 10 and 11 denote multicore optical connectors. End faces 10a and 11a of the multicore optical connectors 10 and 11 have a pair of alignment pin holes 13 and optical fiber holes 12 formed therebetween. Optical fibers of a multicore optical fiber tape 16 are inserted in the optical fiber holes 12 so that the end faces thereof are exposed. A pair of alignment pins 14 are inserted in the alignment pin holes 13 of the multicore optical connectors 10 and 11. More specifically, one end portion of the pair of alignment pins is inserted in the alignment pin holes 13 of the connector 10, and the other end portion is inserted in the alignment pin holes 13 of the connector 11. In this manner, the connection end faces 10a and 11a of the connectors 10 and 11 are brought into contact with each other. Thereafter, the connectors 10 and 11 are held together by an elastic clip 15.

As described above, the conventional multicore optical connector has a plurality of optical fiber holes arranged in a row and interposed between a pair of alignment pin holes 13. With this structure, only two to nineteen optical fibers can be connected at a time by using conventional multicore optical connectors.

In recent years, with the expansion of optical communication networks to transmit a greater amount of information, demand has arisen for a more compact optical connector for connecting a greater number of optical fibers than is possible using conventional optical connectors.

If the pitch of the optical fiber holes is reduced to increase the number of optical fiber holes, it becomes difficult to determine which optical fiber should be inserted in which optical fiber hole. As a result, the efficiency with which multicore optical connectors are manufactured is greatly reduced.

Further, the number of optical fibers contained in one multicore optical fiber tape cannot be changed. Therefore, to manufacture a multicore optical connector for connecting a greater number of optical fibers, it is necessary to use a plurality of multicore optical fiber tapes. Thus, if the optical fiber holes are arranged at regular pitches, the side end portions of adjacent optical fiber tapes will overlap each other when optical fibers are inserted in the optical fiber holes. As a result, optical fibers near the end portion of an optical fiber tape may be bent. This bent or the like is undesirable since it may cause the increase of connection loss.

SUMMARY OF THE INVENTION

An object of the present invention is to provide a compact multicore optical connector which can connect a greater number of optical fibers than a conventional optical connector, while reducing the possibility of connection loss.

The object can be attained by a multicore optical connector including a connector body having a pair of alignment pin holes and a plurality of optical fiber holes formed therebetween and optical fibers inserted in the optical fiber holes such that the end faces of the optical fibers are exposed through the optical fiber holes, wherein the optical fiber holes are divided into optical fiber hole groups the number of which coincides with the number of groups of optical fibers, and the optical fiber hole groups are separated from one another.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Embodiments of the multicore optical connector of the present invention will now be described, with reference to the accompanying drawings.

Figure 1:
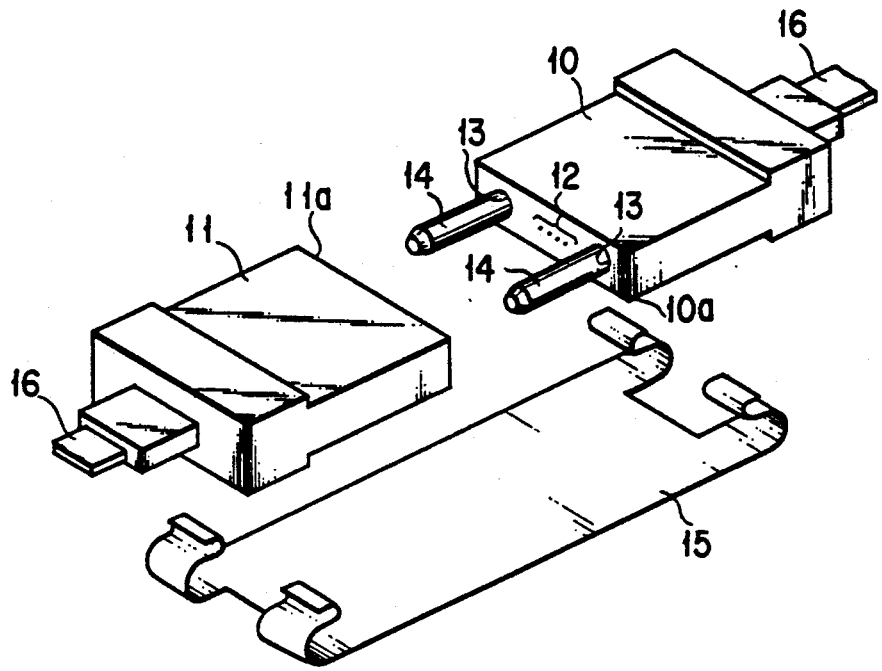
FIG. 1 is a perspective view showing a conventional multicore optical connector.
Figure 2:
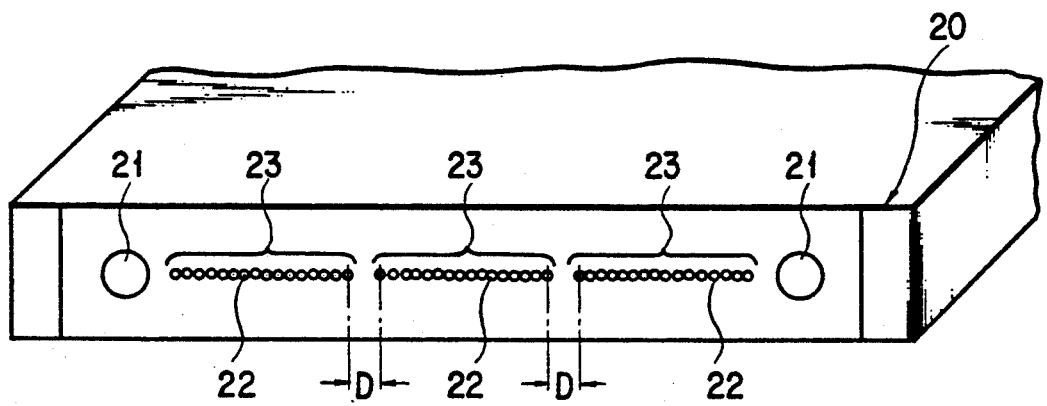
FIG. 2 is a diagram showing a multicore optical connector according to an embodiment of the present invention.
Figure 3:
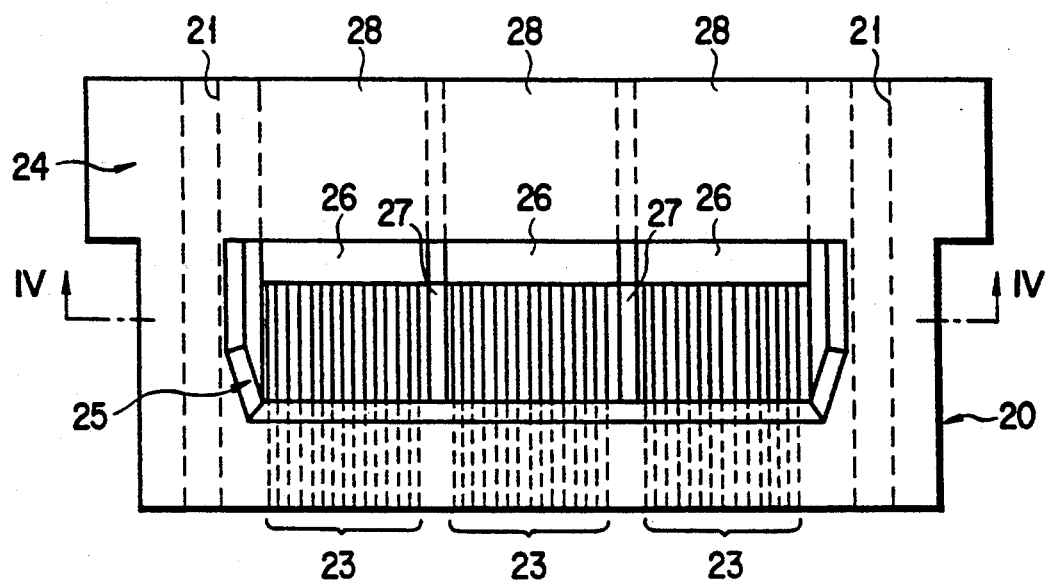
FIG. 3 is a plan view of the multicore optical connector shown in FIG. 2.
Figure 4:
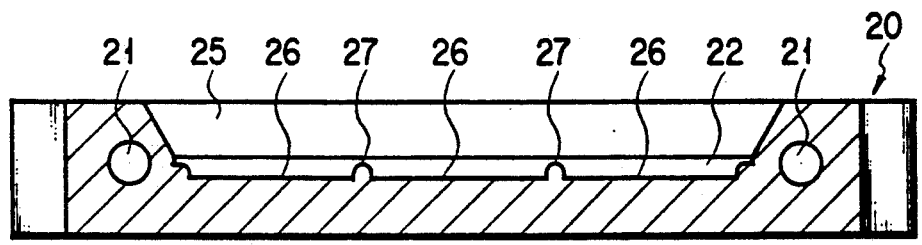
FIG. 4 is a cross-sectional view of the multicore optical connector taken along the line IV—IV in FIG. 3.

FIGS. 2 to 4 show an embodiment of the present invention. The connection end face of the multicore optical connector 20 has a pair of alignment pin holes 21. Optical fiber holes 22 are formed between the alignment pin holes 21. The optical fiber holes 22 are divided into a plurality of optical fiber hole groups 23, each constituted by a plurality of optical fiber holes arranged at a pitch of about 180 to 250 $\mu$m. It is desirable that the distance D between the optical fiber hole groups should be 300 to 1500 $\mu$m. If the distance D is smaller than 300 $\mu$m, distance D is indistinguishable from the pitch of optical fiber hole, and if it is greater than 1500 $\mu$m, the size of the optical connector is to be large.

Although the number of the optical fiber holes 22 constituting one optical fiber hole group 23 is set to 16 in the embodiment shown in FIG. 2, it can be changed in accordance with the number of optical fibers contained in an optical fiber tape. It is desirable that the number of the optical fiber holes 22 should coincide with the number of the optical fibers included in the optical fiber tape.

Although the number of the optical fiber hole groups 23 is three in the embodiment shown in FIG. 2, it may be two or more than three so that the number of optical fiber hole groups matches the number of optical fiber tapes.

As shown in FIGS. 3 and 4, an opening 25 is formed in the central portion of a main surface 24 of the multicore optical connector 20 so as to reach to the optical fiber holes 22. Guide portions 26, on which optical fiber tapes are placed, are formed at the bottom of the opening 25 and partitioned by partitioning portions 27. The number of the guide portions 26 coincides with the number of the optical fiber hole groups 23 (e.g., three, in this embodiment). Optical fiber tape inserting holes 28 are formed in the end face on the opposite side of the multicore optical connector from the connection end face. The optical fiber tape inserting holes 28 communicate with the opening 25. The partitioning portions 27 reaches the end face of the optical connector 20 having the optical fiber tape inserting holes 28. Thus, the mechanical strength of the optical connector 20 is improved, thereby preventing the optical connector from cracking. The cross section of the partitioning portions 27 may be semicircular as shown in FIG. 4, or rectangular.

When optical fibers are to be loaded in the above-described multicore optical connector, for example, three 16-core optical fiber tapes and boots are inserted through the optical fiber tape inserting holes 28. The optical fiber tapes are guided by the guide portions 26 and the optical fibers are inserted in the corresponding optical fiber holes 22. At this time, the optical fiber tapes do not overlap or interrupt each other by virtue of the partitioning portions 27. Since the opening 25 is formed in the multicore optical connector, the optical fiber tapes can be inserted very easily. Further, since the optical fiber holes 22 are divided into three optical fiber hole groups 23, the optical fibers can be inserted to the corresponding optical fiber holes without failure. Moreover, since the optical fiber hole groups 23 are separated at the distance D from one another, the optical fiber tapes do not overlap when inserted. As a result, the optical fibers are prevented from being bent, thereby reducing the connection loss.

Figure 5:
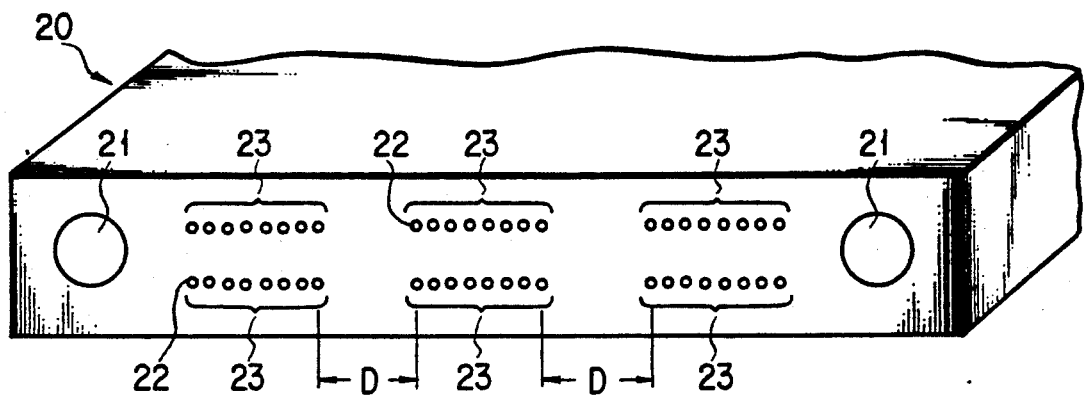
FIG. 5 is a diagram showing a multicore optical connector according to another embodiment of the present invention.

FIG. 5 shows another embodiment of the multicore optical connector according to the present invention. A multicore optical connector 20 has a pair of alignment pin holes 21 and six optical fiber hole groups 23 arranged in two rows and three columns between the alignment pin holes 21, each group consisting of 8 optical fiber holes 22. With this arrangement, a more highly integrated multicore optical connector can be obtained.

As has been described above, the multicore optical connector of the present invention is more compact and capable of connecting a greater number of optical fibers with less connection loss as compared to a conventional connector. Thus, it is well suited for application to an optical communication network for transmitting a large amount of information.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A multicore optical connector, comprising:
    a connector body having top and bottom walls joined to each other by front and rear end walls to define a cavity;
    a pair of alignment pin holes formed in said front end wall;
    an opening formed in said rear end wall sized to accommodate a plurality of optical fibers;
    a plurality of optical fiber holes formed in said front end wall interposed between said alignment pin holes so that end faces of optical fibers accommodated in said opening and extending through the cavity in the connector body are respectively exposed through said optical fiber holes, wherein said optical fiber holes are divided into groups which coincide in number with groups of optical fibers;
    partition walls extending at least part way between said top and bottom walls and extending longitudinally along the optical fibers to partition said cavity and thereby separate adjacent groups of the optical fibers from each other; and
    a window formed in one of said top and bottom walls to communicate with the cavity in said connector body.

2. A multicore optical connector according to claim 1, wherein each of the optical fiber hole groups is constituted by two to nineteen optical fiber holes.

3. A multicore optical connector according to claim 1, wherein the plurality of optical fiber hole groups are constituted by a plurality of columns.

4. The multicore optical connector of claim 1, wherein said partitions extend fully to said top and bottom walls.

5. The multicore optical connector of claim 1, wherein said partitions begin at said rear end face for guiding insertion of the optical fiber groups into respective partitioned portion of the cavity in said connector body.

6. The multicore optical connector of claim 1, wherein said window is sized to extend across all the optical fibers in the connector body.

* * * * *